# 2,822,300

PHOTOCONDUCTIVE MATERIAL

Edward F. Mayer, Cleveland, and Lloyd Owens, Cleveland Heights, Ohio, assignors to Horizons Incorporated, Princeton, N. J., a corporation of New Jersey No Drawing. Application March 29, 1954
Serial No. 419,562

8 Claims. (Cl. 117—201)

This invention relates to photoconductive materials and, more particularly, to a novel photoconductive material and the method of making this material.

The present activity in the fields of photoconductive television pick-up tubes, electrostatic photography and electrostatic printing has heightened the interest in photoconductive materials. The photoconductive materials which have heretofore been used preferentially are elemental amorphous selenium, antimony trisulfide and zinc-cadmium sulfide. Each of these materials has a spectral response which makes them suitable for use in photoconductive image-viewing tubes and in electrostatic photographic and printing devices. Although these materials have extremely high resistance in the dark, generally of the order of $10^{11}$ ohm centimeters, and have a resistance decrease factor of about 100 when illuminated, each of these materials has a serious limitation. For example, selenium is unstable at temperatures slightly above 100° F. and tends to become conductive even in the dark at these elevated temperatures. Moreover, selenium has a spectral response which is nearly exclusively limited to the blue band of the visible spectrum. Antimony trisulfide, on the other hand, has a wider spectral response than selenium but its sensitivity to excitation by light within this spectral range is lower than that of selenium. Zinc-cadmium sulfide has a spectral response similar to that of antimony trisulfide but is much less light-sensitive than the latter.

We have now discovered that the incorporation of elemental arsenic with elemental selenium not only increases the spectral response of the selenium but also greatly increases its photoconductive stability at elevated temperature. This improvement in the photoconductive qualities of selenium are discernible upon the addition to the selenium of only a very small amount of arsenic, say 1% by weight, and a progressive improvement in the photoconductive qualities of the selenium are obtained by increasing amounts of arsenic up to substantially equiatomic proportions of arsenic and selenium corresponding to 48.7% by weight of arsenic and 51.3% by weight. Amounts or arsenic exceeding this approximately equiatomic proportion tend to lower the sensitivity of the resulting material to illumination.

Accordingly, the novel photoconductive material of our present invention comprises a homogeneous mixture of elemental arsenic and elemental selenium in which the atomic ratio of arsenic to selenium does not exceed about 1:1. Our novel method of increasing the spectral response, light sensitivity and photoconductive stability of elemental selenium comprises admixing with the selenium an amount of elemental arsenic not atomically exceeding the selenium, and heating the resulting mixture in a closed vessel to a temperature above the melting point of selenium for a period of time sufficient to form a substantially homogeneous mixture of the arsenic and selenium.

The selenium which is useful for this purpose should be of as high purity as can be obtained, for the higher the purity of the selenium the better are its photoconductive properties. Technical grade selenium is generally unsatisfactory for this purpose; however, higher grades of selenium, particularly that which is nearly spectroscopically pure and contains not more than a few parts per million of total impurities, are satisfactory as a starting material for use in practicing our invention. The arsenic should also be of high purity and is readily available in this condition.

The required homogeneous mixture of the selenium and arsenic is obtained by melting the mixture of arsenic and selenium in the proper proportions in a sealed container. The selenium melts at a much lower temperature than the arsenic and progressively dissolves the arsenic over a period of time until a substantially homogeneous mixture of arsenic and selenium is formed. In general, we have found it advantageous to use melting temperatures of about 750° F. to about 900° F. and within this range temperatures of about 800°–850° F. are highly effective.

The resulting homogeneous mixture of elemental arsenic and elemental selenium may be incorporated in a photoconductive element by conventional vacuum evaporation techniques. For example, the material may be placed in a closed container capable of being evacuated. The arsenic-selenium material is supported in a suitable open vessel within this container, and the substrate upon which the arsenic-selenium mixture was to be deposited is suspended above the open top of this vessel. After the container has been evacuated to a pressure less than about 0.5 micron, the vessel containing the arsenic-selenium mixture is heated by any suitable electrical means so as to promote vaporization of the arsenic-selenium mixture. The vaporized mixture deposits on the relatively cool substrate thereabove without significant change in composition, and this evaporation and deposition is continued for a period of time sufficient to build up on the substrate an arsenic-selenium deposit of the desired thickness. For use in photoconductive image-viewing tubes and the like, the layer of arsenic-selenium mixture of our invention is advantageously from 0.2 to 0.5 mil thick, whereas for electrostatic photography and printing the arsenic-selenium layer is preferably from 0.8 to 1.5 mils thick. The distillation-deposited material exhibits the properties of a "hole-type" conductor and conducts most readily under illumination when it forms the positive electrode of an electrostatic system. The ratio of light sensitivity under illumination when the arsenic-selenium mixture of our invention is made positive or negative is about 25:1.

The following specific example will be illustrative of the practice of the method of our invention. Weighed amounts of elemental arsenic and elemental selenium were placed in a sealed container in the atomic proportions of about 2 atoms of arsenic to about 3 atoms of selenium. This mixture was heated in the sealed container to a temperature of about 825° F. for a period of at least 30 minutes so as to insure the formation of a completely homogeneous mixture of the two elements. After cooling the container, the resulting homogeneous mixture of arsenic and selenium was removed and comprised the novel photoconductive material of our invention. The light sensitivity of this material was approximately 10 times that of amorphous selenium alone, and the spectral response of our novel material had a broad spectral response peaking in the neighborhood of 5200 angstroms as compared with a narrow spectral response having sharp cut-off at 4500 angstroms in the case of selenium alone. The spectral response of this material closely approximates the spectral response of the human eye and makes it ideal for photoconductive surfaces suitable both for television pick-up tubes and for electrostatic photography. The thermal stability of this material is indicated by the fact that it showed no significant deterioration in its photoconductivity (i. e. its high resistance in the dark in excess of $10^{11}$ ohm centimeters) until a temperature of about 200° F. was reached, and even above this temperature the conductivity of the material did not increase as rapidly with increasing temperature as in the case of selenium alone.

It will be appreciated, accordingly, that the novel photoconductive material of our invention is characterized by a wide spectral response closely approximating the spectral response of the human eye, by a high degree of light sensitivity and by a high degree of thermal stability compared to the best photoconductive materials heretofore available.

We claim:

1. The method of increasing the spectral response, light sensitivity and photoconductive stability of elemental selenium which comprises admixing therewith an amount of elemental arsenic between about 1% and 48.7% by weight, and heating the resulting mixture in a closed vessel to a temperature above about 750° F. for a period of time sufficient to form a completely homogeneous mixture of the arsenic and selenium.

2. The method of increasing the spectral response, light sensitivity and photoconductive stability of elemental selenium which comprises admixing substantially pure elemental selenium and substantially pure elemental arsenic in the ratio of about 3 atoms of selenium to about 2 atoms of arsenic and heating the resulting mixture in a closed vessel to a temperature above about 750° F. for a period of time sufficient to form a completely homogeneous mixture of the arsenic and selenium.

3. The method of increasing the spectral response, light sensitivity and photoconductive stability of elemental selenium which comprises: admixing therewith an amount of arsenic in an amount between about 1% by weight and an amount not exceeding equiatomic proportions, heating the resulting mixture in a closed vessel to a temperature greater than 750° F., and maintaining the mixture at the temperature for a period of time sufficient to dissolve all of the arsenic in the selenium, to distribute the arsenic uniformly throughout the selenium and thereafter converting the product into a uniform film less than about a few mils thick but retaining the homogeneity of the solution, by evaporating the material under a vacuum and depositing it on a relatively cool substrate.

4. A photoconductive device comprising a photoconductive film having a thickness of between about 0.002 inch and about 0.0015 inch and consisting essentially of a homogeneous mixture of arsenic and selenium in which the ratio of arsenic to selenium lies between about 1% by weight of arsenic and about 48.7% by weight of arsenic, and having a resistance in the dark of the order of $10''$ ohm centimeters.

5. A photoconductive device comprising a vapor deposited photoconductive film having a thickness of less than about 0.0015 inch and consisting essentially of arsenic and selenium in which the atomic ratio of arsenic to selenium is about 2 atoms of arsenic to 3 atoms of selenium, and having a resistance in the dark of about $10''$ ohm centimeters, and a support on which said film has been deposited.

6. A photoconductive device comprising a photoconductive film less than about 0.001 inch in thickness and consisting essentially of arsenic and selenium and having a resistance in the dark of about $10^{11}$ ohm centimeters.

7. A photoconductive device comprising a photoconductive film less than about 0.001 inch in thickness and consisting essentially of arsenic and selenium in which the ratio of arsenic to selenium lies between about 1% and about 48.7% by weight.

8. A photoconductive device comprising a vapor deposited photoconductive film consisting essentially of arsenic and selenium and having a resistance in the dark of about $10^{11}$ ohm centimeters.

References Cited in the file of this patent

FOREIGN PATENTS 314,838    Great Britain _____ July 3, 1929

OTHER REFERENCES

Chemical Abstracts, vol. 19, col. 1231$^5$ (1925), abstract of Monatsh. 54, pages 235–50 (1925).

Chemical Abstracts, vol. 2, col. 2345$^3$ (1908), abstract of Compt. Rend., vol. 146, page 975 (1908).

U. S. DEPARTMENT OF COMMERCE

PATENT OFFICE

CERTIFICATE OF CORRECTION

Patent No. 2,822,300                              February 4, 1958

Edward F. Mayer et al.

It is hereby certified that error appears in the printed specification of the above numbered patent requiring correction and that the said Letters Patent should read as corrected below.

Column 1, line 55, after "weight" and before the period insert --of selenium--; same line, for "Amounts or" read --Amounts of--.

Signed and sealed this 22nd day of April 1958.

(SEAL)
Attest:

KARL H. AXLINE

Attesting Officer

ROBERT C. WATSON
Commissioner of Patents